(12) United States Patent
Stauder et al.

(10) Patent No.: US 10,553,178 B2
(45) Date of Patent: Feb. 4, 2020

(54) ADAPTIVE COLOR GRADE INTERPOLATION METHOD AND DEVICE

(71) Applicant: THOMSON Licensing, Issy-les-Moulineaux (FR)

(72) Inventors: Jurgen Stauder, Montreuil/Ille (FR); Philippe Bordes, Laille (FR); Christel Chamaret, Chantepie (FR)

(73) Assignee: INTERDIGITAL VC HOLDINGS, INC., Wilmington, DE (US)

(*) Notice: Subject to any disclaimer, the term of this patent is extended or adjusted under 35 U.S.C. 154(b) by 182 days.

(21) Appl. No.: 15/557,123

(22) PCT Filed: Feb. 29, 2016

(86) PCT No.: PCT/EP2016/054243
§ 371 (c)(1),
(2) Date: Sep. 10, 2017

(87) PCT Pub. No.: WO2016/142203
PCT Pub. Date: Sep. 15, 2016

(65) Prior Publication Data
US 2018/0047367 A1 Feb. 15, 2018

(30) Foreign Application Priority Data
Mar. 10, 2015 (EP) .................................... 15305358

(51) Int. Cl.
*G09G 5/00* (2006.01)
*G09G 5/02* (2006.01)
*G09G 5/10* (2006.01)

(52) U.S. Cl.
CPC ............... *G09G 5/02* (2013.01); *G09G 5/005* (2013.01); *G09G 5/10* (2013.01); *G09G 2320/0666* (2013.01); *G09G 2340/06* (2013.01)

(58) Field of Classification Search
CPC ............ G09G 5/02; G09G 5/005; G09G 5/10; G09G 2320/0666; G09G 2340/06; G09G 2340/10; H04N 9/64
See application file for complete search history.

(56) References Cited

U.S. PATENT DOCUMENTS 5,317,426 A * 5/1994 Hoshino ............... H04N 1/6058
358/501
5,450,216 A * 9/1995 Kasson ................ H04N 1/6058
345/603

(Continued)

FOREIGN PATENT DOCUMENTS

CN 101569171 A 10/2009
CN 102349290 A 2/2012

(Continued)

OTHER PUBLICATIONS

Banterle et al., "Inverse Tone Mapping", 4th International Conference on Computer Graphics and Interactive Techniques in Australasia and Southeast Asia, Graphite '06, Kuala Lumpur, Malaysia, Nov. 29, 2006, pp. 349-356.

(Continued)

*Primary Examiner* — Manav Seth
(74) *Attorney, Agent, or Firm* — Brian J. Dorini; Patricia A. Verlangieri

(57) ABSTRACT

An adaptive color grade interpolation method is disclosed. The method comprises interpolating from a first color graded version of a picture adapted to first viewing conditions and a second color graded version of said picture different from the first color graded version and adapted to second viewing conditions in order to obtain a third color graded version of the picture adapted to third viewing conditions wherein said interpolating is obtained from said first color graded version, a first mapped color version of said first color graded version adapted to said third viewing (Continued)

conditions and to a second mapped color version of said first color graded version adapted to said second viewing conditions such that said first color graded version and second mapped color version are interpolated into said first mapped color version.

18 Claims, 5 Drawing Sheets

(56) References Cited

U.S. PATENT DOCUMENTS

| | | | | |
|---|---|---|---|---|
| 5,500,921 | A * | 3/1996 | Ruetz | H04N 1/6058 345/590 |
| 6,342,951 | B1 * | 1/2002 | Eschbach | H04N 1/4072 358/1.9 |
| 6,611,356 | B1 | 8/2003 | Shimizu et al. | |
| 7,053,927 | B2 | 5/2006 | Jones et al. | |
| 7,061,503 | B2 * | 6/2006 | Newman | H04N 1/6011 345/591 |
| 7,146,038 | B2 * | 12/2006 | Kagawa | H04N 1/6058 382/166 |
| 7,782,492 | B2 * | 8/2010 | Seko | H04N 1/6058 358/2.1 |
| 7,944,584 | B2 * | 5/2011 | Hagai | H04N 1/6019 358/1.1 |
| 8,063,911 | B2 * | 11/2011 | Ramanath | G09G 5/02 345/204 |
| 8,134,547 | B2 * | 3/2012 | Gil | G09G 5/02 345/207 |
| 8,139,274 | B2 * | 3/2012 | Kang | H04N 1/6058 358/1.9 |
| 8,194,103 | B2 * | 6/2012 | Tsai | G09G 5/026 345/590 |
| 8,259,125 | B2 * | 9/2012 | Ramanath | G09G 5/02 345/581 |
| 8,274,525 | B2 * | 9/2012 | Langendijk | G09G 5/02 345/590 |
| 8,340,410 | B1 | 12/2012 | Srinivasan | H04N 9/68 348/256 |
| 8,390,550 | B2 * | 3/2013 | Tsai | G09G 5/026 345/590 |
| 8,605,017 | B2 * | 12/2013 | Brown Elliott | G02F 1/133621 345/102 |
| 8,743,291 | B2 * | 6/2014 | Li | G06T 5/009 345/603 |
| 8,767,004 | B2 * | 7/2014 | Longhurst | H04N 1/6058 345/589 |
| 9,042,682 | B2 * | 5/2015 | Atkins | G06T 3/4007 382/300 |
| 10,027,996 | B2 * | 7/2018 | Oh | H04N 21/23 |
| 10,158,835 | B2 * | 12/2018 | Gish | G09G 5/02 |
| 2007/0013812 | A1 | 1/2007 | Ajito et al. | |
| 2009/0040335 | A1 | 2/2009 | Ito et al. | |
| 2012/0026405 | A1 * | 2/2012 | Atkins | G11B 27/034 348/651 |
| 2012/0050352 | A1 | 3/2012 | Baba et al. | |
| 2012/0057044 | A1 | 3/2012 | Shimizu | |
| 2012/0163717 | A1 * | 6/2012 | Cho | H04N 1/603 382/167 |
| 2013/0027615 | A1 * | 1/2013 | Li | H04N 17/02 348/571 |
| 2013/0038790 | A1 | 2/2013 | Seetzen et al. | |
| 2013/0148029 | A1 * | 6/2013 | Gish | G09G 5/02 348/708 |
| 2013/0315505 | A1 | 11/2013 | Atkins et al. | |
| 2014/0225941 | A1 | 8/2014 | Van Der Vleuten et al. | |

FOREIGN PATENT DOCUMENTS

| | | |
|---|---|---|
| EP | 2498499 | 9/2012 |
| EP | 2667378 | 11/2013 |
| JP | 2000134490 | 5/2000 |
| JP | 2003173438 A | 6/2003 |
| JP | 2010286554 A | 12/2010 |
| JP | 2012054811 A | 3/2012 |
| WO | WO 2005074302 A1 | 8/2005 |
| WO | WO 2008085150 A1 | 7/2008 |
| WO | WO2010082692 | 7/2010 |
| WO | WO 2010104624 A2 | 9/2010 |
| WO | WO2014009844 | 1/2014 |

OTHER PUBLICATIONS

Bonneel et al., "Example-Based Video Color Grading", ACM Transactions on Graphics—SIGGRAPH 2013 Conference Proceedings, vol. 32, No. 4, Article No. 39, Jul. 2013, pp. 1-11.

Mantiuk et al., "Display Adaptive Tone Mapping", ACM Transactions on Graphics—SIGGRAPH 2008 Conference Proceedings, vol. 27, No. 3, Article No. 68, Aug. 2008, pp. 1-10.

Morovic et al., "The Fundamentals of Gamut Mapping: A Survey", Journal of imaging Science and Technology, vol. 45, No. 3, May/Jun. 2001, pp. 283-290.

Reinhard et al., "Chapter 6: The Human Visual System and HDR Tone Mapping", High Dynamic Range Imaging, Aquisition, Display, and Image-Based Lighting, The Morgan Kaufmann Series in Computer Graphics, Elsevier Inc., New York, 2006, pp. 187-219.

* cited by examiner

ADAPTIVE COLOR GRADE INTERPOLATION METHOD AND DEVICE

This application claims the benefit, under 35 U.S.C. § 365 of International Application PCT/EP16/054243, filed Feb. 29, 2016, which was published in accordance with PCT Article 21(2) on Sep. 15, 2016, in English, and which claims the benefit of European Patent Application No. 15305358.2 filed Mar. 10, 2015.

1. TECHNICAL FIELD

In the following, an adaptive color grade interpolation method and device are disclosed.

2. BACKGROUND ART

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In creation and distribution of pictures and videos, it is known to produce a first original video for a specific original display having original viewing conditions. In the following, viewing conditions include both the display on which the content is rendered and the environment of the rendering. Thus viewing conditions can include the color gamut of the display, the maximum luminance of the display, but also ambient light falling on the display, the luminance and chromaticity of the background, the adopted white of the human eye, the viewing distance, or the temporal evolution in any of those conditions.

It is further known, that the creator of the video produces a second, reference version of the video that is well adapted to be displayed on a reference display having reference viewing conditions that are different from the original viewing conditions. This reference video may be generated either by manual color grading or by color processing such as gamut mapping and tone mapping or a combination of manual color grading followed by color processing.

However such mentioned reference video is of fixed nature in the sense that it contains colors that should be shown under reference viewing conditions. If the viewing conditions are different from reference viewing conditions, the reference video does not show up correctly. For example, neither the reference video nor the original video can be displayed on a target display having target viewing conditions that are different from both the original and reference viewing conditions. Indeed, target viewing conditions depend on end-users displays having various different characteristics (e.g. different color gamut, different black levels, different peak luminances, different maximum full frame luminances, bit depth, etc) since based on different technologies (LCD, OLED, LCD with LED backlight, LCD with Quantum dots layer, . . . ) and/or different architecture (TV set, smart-phone). Target viewing conditions further depend on the specific application, for instance a version of video content adapted for viewing in theaters may be perceived very differently if the same version is played in other viewing environment such as in home with a DVD or Blu-Ray player.

Consequently, the end-users display when displaying either the original or the reference video fails to preserve the artistic intent of the colorist because some colors, as specified by the colorist, in the original or reference video may not be preserved during display.

A solution to solve this issue is to use adjustable color mapping operators, such as tone mappers and color gamut mappers, to create a new version of the video that is adapted to target viewing conditions as shown in FIG. 1. Such tone mapper is for example described by Erik Reinhard in his book entitled "*High dynamic range imaging*" published by Morgan Kaufmann in 2006 (chapter 6). However, those operators have poor performance for example with respect to adaptation to local image regions, or with respect to adaptation to specific light situations, or with respect to dark, medium or high colors, or with respect to specific semantic objects such as human faces. Indeed, since the performance of those operators is not acceptable, creators prefer to generate different video versions by manual color grading that will take into account the specific reference viewing conditions.

Other solution is disclosed into EP2498499 A1 wherein a first image data depicting the image associated with first gamut and second image data depicting the image associated with second gamut are interpolated into output image for display on a target display associated with a target gamut wherein the interpolation parameters are directly derived from the target gamut and from gamuts associated with the first and second image data. Similarly EP2667378 A1 discloses that first images in a first version of a particular image targeted for a first class of display and second images in a second different version targeted for a second different class of displays are interpolated to obtain third images being targeted for a third class of displays wherein the interpolating may change for clusters inside the images. However as for adjustable color operators, such solution fails to cope with a high range of adaptation to viewing conditions and to cope with image details.

A method for generating a new color video adapted to target viewing conditions from existing color videos adapted to other viewing conditions is therefore desirable where the method is capable of keeping a high range of adaptation to viewing conditions that existing color mapping operators cannot achieve.

3. BRIEF SUMMARY

The purpose of the invention is to overcome at least one of the disadvantages of prior art by proposing a method for interpolating a new color video adapted to target viewing conditions from existing color videos for other viewing conditions while keeping a high range of adaptation to viewing conditions. Indeed, a salient idea of the invention is to generate a new video by interpolating two videos adapted to two viewing conditions among which reference viewing conditions wherein the interpolation function is derived from a first mapped video generated by the color mapping operator set for reference viewing conditions and from a second mapped video generated by the color mapping operator set for target viewing conditions.

According to a first aspect, a method comprising interpolating a first color graded version of a picture adapted to first viewing conditions and a second color graded version of the picture different from the first color graded version and adapted to a second viewing conditions in order to obtain a third color graded version of the picture adapted to a third viewing conditions is disclosed. The interpolating is obtained from said first color graded version, a first mapped color version of the first color graded version adapted to third viewing conditions, a second mapped color version of the first color graded version adapted to second viewing conditions such that said first color graded version and second mapped color version are interpolated into said first mapped color version. Advantageously, the method is adaptive to the targeted (third) viewing conditions, for example the characteristics of the targeted display. Advantageously, the method allows generating versions adapted to any targeted viewing conditions from only two content versions (original and reference images). Advantageously, the method preserves complex color changes between different content versions, color changes that the simple color mapping operator cannot describe.

According to a specific characteristic, viewing conditions comprise at least one of:
- display maximum luminance;
- display minimum luminance;
- display color gamut;
- environment maximum luminance;
- environment mean luminance;
- environment dominant color.

According to another specific characteristic, first and second mapped color versions of the picture are obtained by a color mapping algorithm adjusted for viewing conditions and configured to map at least a color into a mapped color adapted to viewing conditions.

According to a first embodiment, the interpolating comprises:
- mapping the first color graded version into the first mapped color version adapted to third viewing conditions using the color mapping operator adjusted for third viewing conditions;
- mapping the first color graded version into a second mapped color version adapted to second viewing conditions using the color mapping operator adjusted for second viewing conditions;
- obtaining an interpolation function from the first color graded version, first mapped color version and second mapped color version defined such that the interpolation function interpolates the first color graded version and second mapped color version into the first mapped color version;
- applying the interpolation function to the first color graded version and the second color graded version to obtain the third color graded version.

According to a second embodiment, a tone mapping algorithm is used as a color mapping algorithm and the interpolating comprises:
- obtaining a first luminance from the first color graded version;
- mapping the first luminance into a first mapped luminance adapted to third viewing conditions using the tone mapping algorithm adjusted for third viewing conditions;
- mapping the first luminance into a second mapped luminance adapted to second viewing conditions using the tone mapping algorithm adjusted for second viewing conditions;
- obtaining an interpolation function from the first luminance, first mapped luminance and second mapped luminance defined such that the interpolation function interpolates the first luminance and the second mapped luminance into the first mapped luminance;
- applying the interpolation function to the first color graded version and the second color graded version to obtain the third color graded version.

According to a third embodiment, a gamut mapping algorithm is used as the color mapping algorithm.

In a specific embodiment, interpolating from the first and second color graded versions of the picture in order to obtain a third color graded version of the picture comprises, for a pixel in the third color graded version of the picture, determining a color value as a result of the obtained interpolation function applied to color values of co-located pixels in the first and second color graded versions of the picture.

According to a second aspect, a device is disclosed that comprises a processor configured to interpolate a first color graded version of a picture adapted to first viewing conditions and a second color graded version of the picture different from the first color graded version and adapted to a second viewing conditions in order to obtain a third color graded version of the picture adapted to third viewing conditions. The processor is configured to obtain said interpolating from said first color graded version, a first mapped color version of the first color graded version adapted to the third viewing conditions and to a second mapped color version of the first color graded version adapted to the second viewing conditions such that said first color graded version and second mapped color version are interpolated into said first mapped color version.

In a variant, a device comprising means for interpolating from a first color graded version of a picture adapted to first viewing conditions and a second color graded version of the picture different from the first color graded version and adapted to a second viewing conditions in order to obtain a third color graded version of the picture adapted to third viewing conditions is disclosed. The device further comprises at one color mapping operator and means for interpolating responsive to a first mapped color version of the first color graded version adapted to the third viewing conditions and to a second mapped color version of the first color graded version adapted to the second viewing conditions.

According to a specific embodiment, the device belongs to a set comprising:
- a mobile device;
- a communication device;
- a game device;
- a set top box;
- a TV set;
- a Blu-Ray disc player;
- a player;
- a tablet (or tablet computer);
- a laptop;
- a display;
- a camera and
- a decoding chip.

According to a third aspect, a computer program product comprising program code instructions to execute the steps of the interpolation method when this program is executed on a computer is disclosed.

According to a fourth aspect, a processor readable medium is disclosed that has stored therein instructions for causing a processor to perform at least interpolating from a first color graded version of a picture adapted to first viewing conditions and a second color graded version of the picture different from the first color graded version and adapted to second viewing conditions in order to obtain a third color graded version of the picture adapted to third viewing conditions, wherein the interpolating is obtained from said first color graded version, a first mapped color version of the first color graded version adapted to the third viewing conditions and to a second mapped color version of the first color graded version adapted to the second viewing conditions such that said first color graded version and second mapped color version are interpolated into said first mapped color version.

According to a fifth aspect, a non-transitory program storage device is disclosed that is readable by a computer, tangibly embodies a program of instructions executable by the computer to perform a method comprising interpolating from a first color graded version of a picture adapted to first viewing conditions and a second color graded version of the picture different from the first color graded version and adapted to second viewing conditions in order to obtain a third color graded version of the picture adapted to third viewing conditions wherein the interpolating is responsive to a first mapped color version of the first color graded version adapted to the third viewing conditions and to a second mapped color version of the first color graded version adapted to the second viewing conditions.

While not explicitly described, the present embodiments may be employed in any combination or sub-combination. For example, the invention is not limited to the described color mapping operators and any adjustable mapper can be used.

Besides, any characteristic or embodiment described for the interpolating method is compatible with a device intended to process the disclosed method and with a computer-readable storage medium storing program instructions.

4. BRIEF SUMMARY OF THE DRAWINGS

Other characteristics and advantages of the invention will appear through the description of a non-limiting embodiment of the invention, which will be illustrated, with the help of the enclosed drawings.

5. DETAILED DESCRIPTION

A color gamut is a certain complete set of colors. The most common usage refers to a set of colors which can be accurately represented in a given circumstance, such as within a given color space or by a certain output device.

A color gamut is often defined by a color space and its dynamic range (i.e. min/max luminance) of the values represented in the color space. A color space may further be specified by color primaries and by the reference white. An example of such a color space is RGB BT.2020 with D65 reference white and with min luminance peak equal to 0 and max luminance peak equal to 1. In this case, the luminance is a relative value. RGB BT.709 with D65 reference white and with min luminance peak equal to 0 and max luminance peak equal to 1 is another example of such a color space. When working with a relative color space, for example BT.709, and a display having an absolute peak luminance, for example 100 cd/m$^2$, a relative luminance of BT.709 is multiplied by 100 resulting in an absolute luminance in the range from 0 cd/m$^2$ to 100 cd/m$^2$. Viewing conditions include additionally characteristics such as absolute maximum luminance (in cd/m$^2$), CIE 1931 x,y chromaticities of the background and/or surround of the display, the viewing distance and the viewing angle of the observer.

Figure 1:
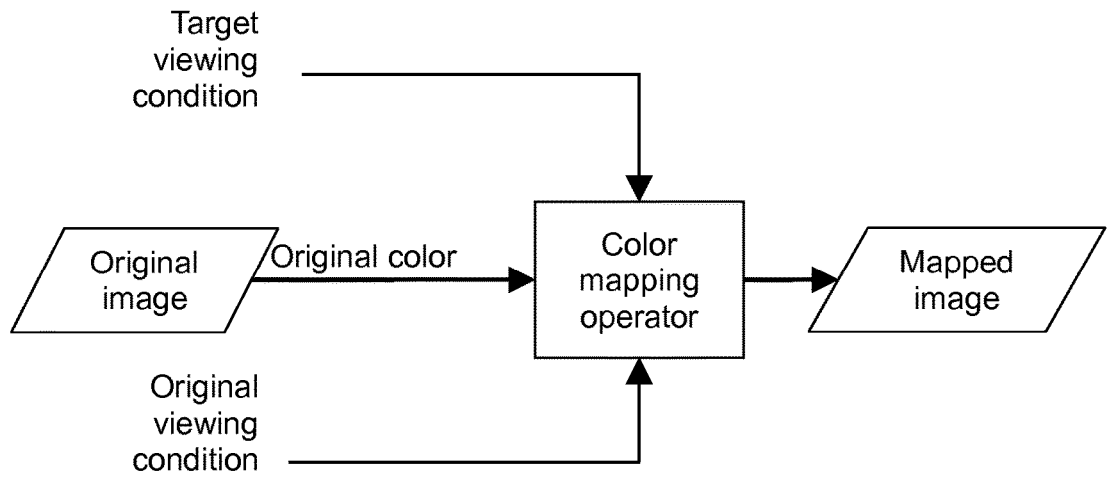
FIG. 1 depicts an adjustable color mapping according to prior art.
Figure 2:
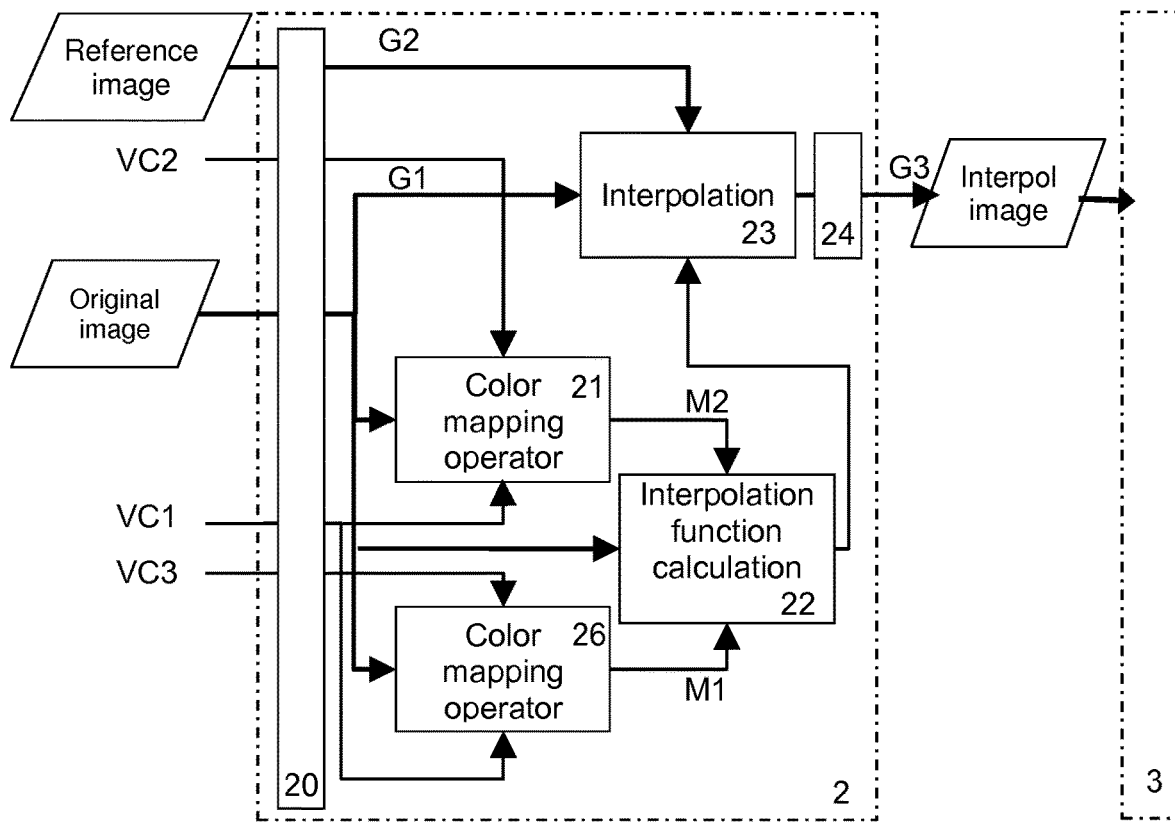
FIG. 2 is a schematic view of a device 2 for obtaining a third color graded version from an interpolation of a first color graded version and a second color graded version of a same picture according to an exemplary and non-limiting embodiment.

FIG. 2 is a schematic view of a device 2 for obtaining a third color graded version from an interpolation of a first color graded version and a second color graded version of a same picture according to an exemplary and non-limiting embodiment. The device 2 comprises an input 20 configured to obtain a first color graded version G1 and second color graded version G2 of at least a picture. The second version is different from the first color graded version. As an example, the two color graded versions have been created on the production side and are adapted to two different viewing conditions respectively VC1 and VC2. As previously discussed, the viewing conditions may include the display on which the color graded version is rendered as well as the environment of the display. The environment may include the surround and the background of the display. According to a particular characteristic, the viewing conditions comprise at least one of:
- display maximum luminance;
- display minimum luminance;
- display color gamut;
- environment maximum luminance;
- environment mean luminance;
- environment dominant color.

In the following, the first color graded version G1 correspond to the original version adapted to original viewing conditions (display and environment) while the second color graded version G2 corresponds to the reference version adapted to reference viewing conditions. The input 20 is configured to obtain third viewing conditions VC3 also called the target viewing conditions. The first color graded version G1 and the second color graded version G2 pictures as well as associated viewing conditions may be obtained from a source. According to different embodiments of the invention, the source belongs to a set comprising:
- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- an image capturing circuit (e.g. a sensor such as, for example, a CCD (or Charge-Coupled Device) or CMOS (or Complementary Metal-Oxide-Semiconductor)).

However the way the two color graded versions are obtained is out of the scope of the present disclosure. Obtaining such two color graded versions for instance comprises decoding the first color graded version from a first bitstream and decoding the second color graded version from a second bitstream different from the first bitstream and stored in a local memory. As an example, the two bitstreams are in conformance with the HEVC video coding standard. They are thus decoded by HEVC compliant decoders.

In another example, obtaining such two color graded versions for instance comprises decoding the first color graded version from a first bitstream and applying a color mapping data to the first color graded version to obtain second color graded version wherein such color mapping data may be decoded from a color remapping information SEI message, known as CRI.

The target viewing conditions may be obtained via a DVI interface or an HDMI interface existing between the end-user display and the device 2 applying the interpolation method. The viewing conditions are for example stored in a non-volatile memory of the end-user display (for example an EDID EPROM, where EDID stands for Extended Display Identification Data). Extended display identification data (EDID) is a data structure provided by a digital display to describe its capabilities to a video source. One or more of original, reference and target viewing conditions may also be defined in a standard, for example a peak luminance of 500 cd/m2 according to BT.2022. In a specific example, the device implementing the interpolation method (the video source for the end-user display) can read the viewing conditions via an I2C bus using, for example, the DDC communication protocol (Display Data Channel protocol for recovering screen-related data). In variant, the interpolation device comprises the end-user display itself. In this latter case, the viewing conditions may be read from a memory or are measured by a color sensor.

The input 20 is linked to a color mapping operator 21 configured to map the first color graded version G1 from first viewing conditions VC1 to second viewing conditions VC2 resulting in a second mapped color version M2. Advantageously, a color mapping operator 21 is adjustable for viewing conditions and configured to map at least a color from any viewing conditions into a mapped color for any other viewing conditions according to a particular color mapping algorithm. The detailed operation of such color mapping algorithm is out of scope of this invention, however examples are described hereafter with reference to specific embodiments. For instance, tone mapping algorithm described by Erik Reinhard in his book (chapter 6) entitled "High dynamic range imaging" are compatible with the invention. The input 20 is also linked to a color mapping operator 26 configured to map the first color graded version G1 from first viewing conditions VC1 to the third viewing conditions VC3 resulting in a first mapped color version M1. The two color mappers 21, 26 may use a same mapping algorithm or different mapping algorithms. In a variant, a single color mapping operator 21 is used sequentially to obtain both mapped color versions. The output of the first color mapping 21 and of the second color mapping 26 are linked to module 22 configured to obtain an interpolation function wherein the interpolating function is responsive to the first mapped color version M1 of the first color graded version adapted to the third viewing conditions VC3 and to the second mapped color version M2 of the first color graded version adapted to the second viewing conditions VC2 as described hereafter. The module 22 is linked to a module 23 configured to obtain the third color graded version G3 from the interpolation function obtain in module 22 applied to the first color graded version G1 and the second color graded version G2. The module 23 is linked to an output 24. The third color graded version G3 adapted to third viewing conditions VC3 can be stored in a memory or can be sent to a display 3. As an example, the third color graded version G3 is stored in a remote or in a local memory, e.g. a video memory or a RAM, a hard disk. In a variant, the third color graded version G3 sent to a display 3 by means of a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

Figure 3:
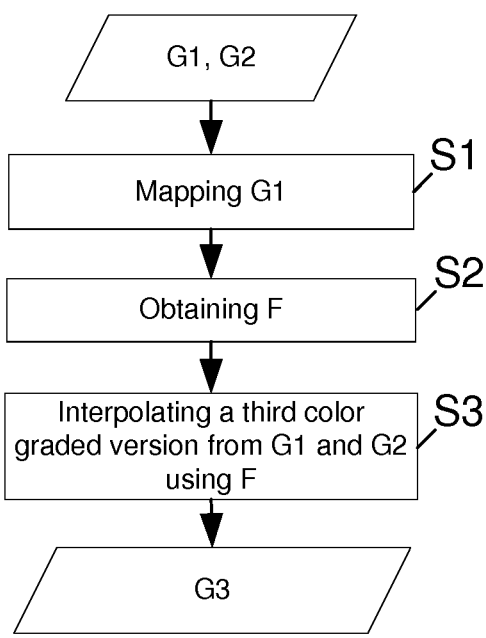
FIG. 3 represents a flowchart of an interpolation method according to an exemplary and non-limiting embodiment.

FIG. 3 represents a flowchart of an interpolation method according to an exemplary and non-limiting embodiment.

In step S1, the first color graded version G1 is mapped from the first viewing conditions VC1 to the third viewing conditions VC3 so as to obtain a first mapped color version M1. Besides, in parallel or sequentially, the first color graded version G1 is further mapped from the first viewing conditions VC1 to the second viewing conditions VC2 so as to obtain a second mapped color version M2.

Figure 5:
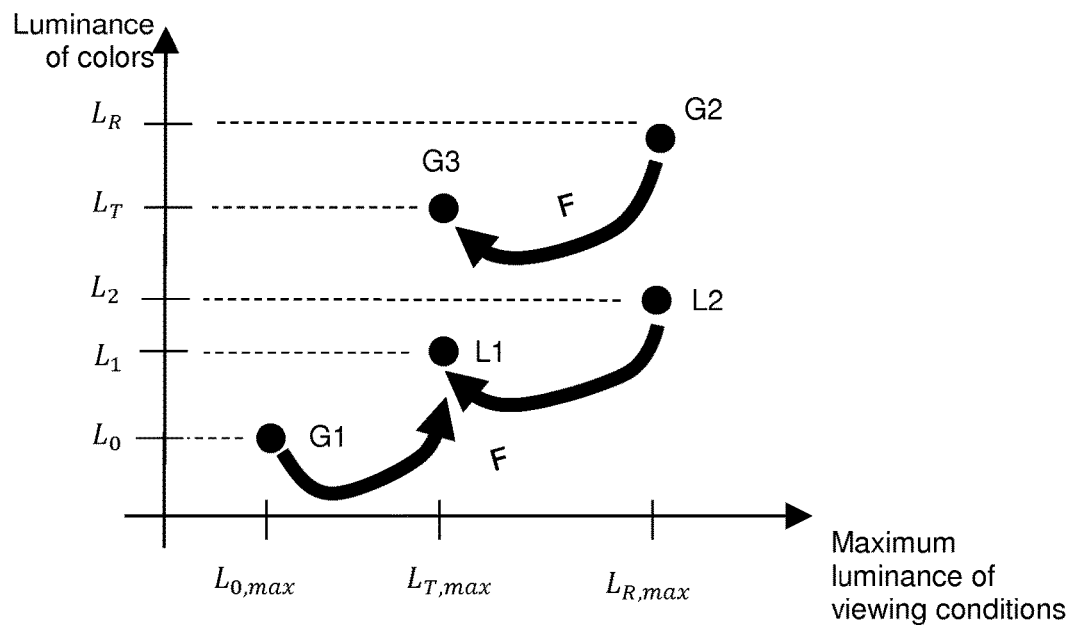
FIG. 5 illustrates the principles of color grade interpolation in a luminance color space.

In step S2, an interpolation function is obtained from said first color graded version, first mapped color version and second mapped color version, the interpolation function F being able to interpolate the first color graded version G1 and second mapped color version M2 into the first mapped color M1 as presented on FIG. 5.

In step S3, a third color graded version G3 of the picture is obtained by interpolating the first color graded version G1 and the second color graded version G2 responsive to the obtained interpolation function F.

Figure 4:
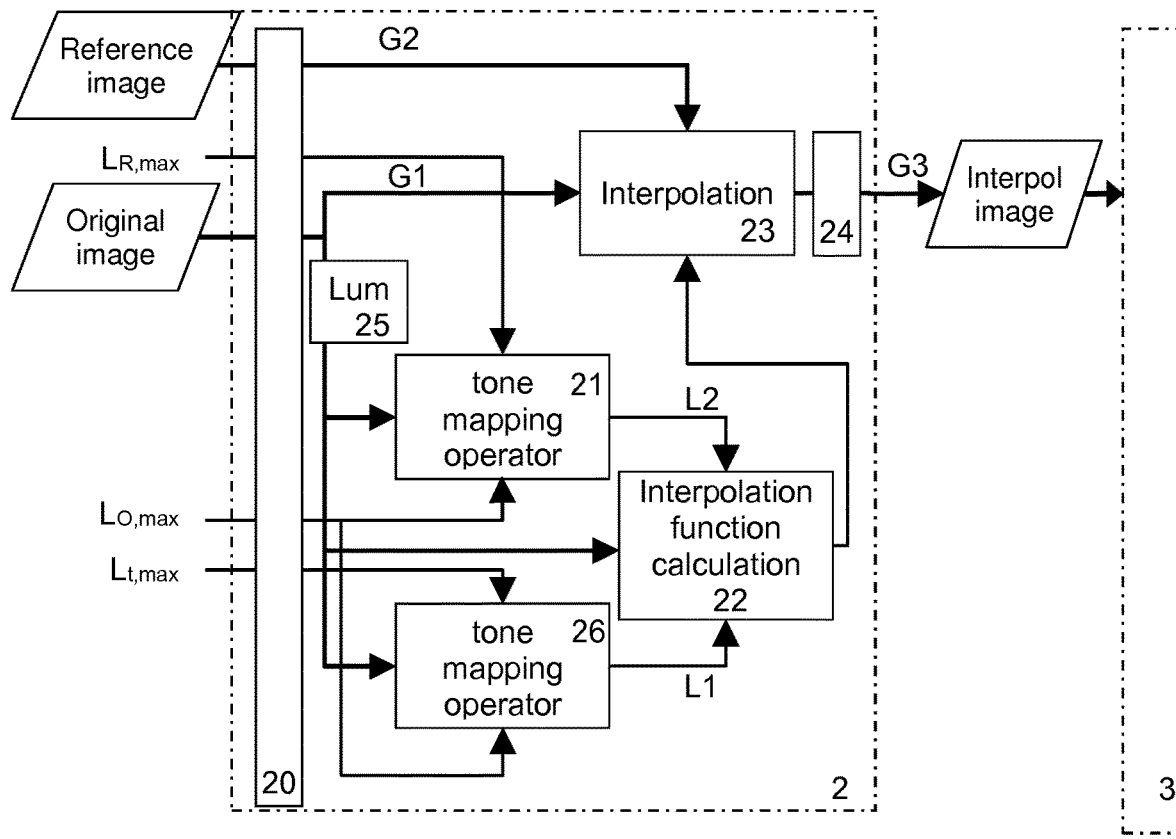
FIG. 4 represents a schematic view of a first embodiment of an adaptive color grade interpolation device 2.
Figure 6:
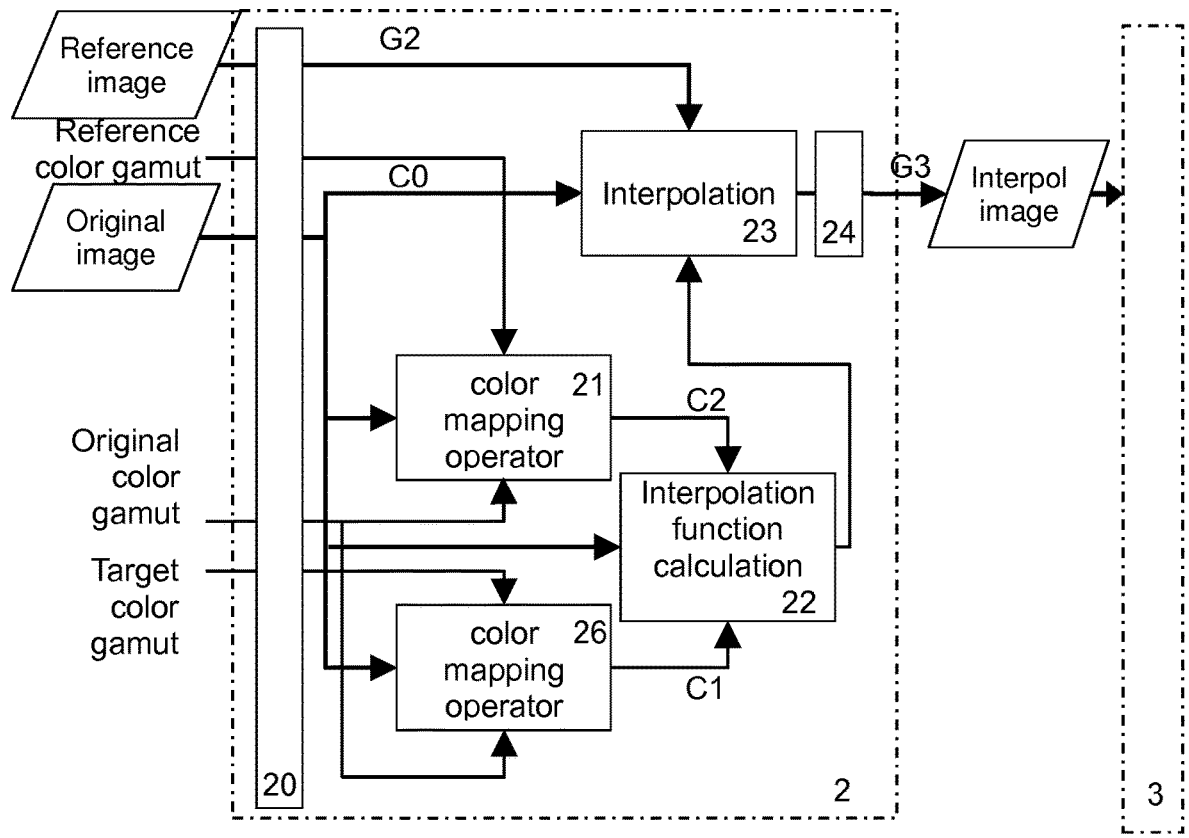
FIG. 6 represents a schematic view of a second embodiment of an adaptive color grade interpolation device 2.

The steps of the method are described hereafter with regard to 2 devices illustrated in FIGS. 4 and 6 where each device implements a different embodiment of the method.

FIG. 4 represents a schematic view of a first embodiment of an adaptive color grade interpolation device 2 compliant with the interpolation method described in FIG. 3. According to the first embodiment, the viewing conditions comprise the maximum display luminance. Advantageously, the first embodiment is adapted to viewing conditions (either target, original or reference) that differ mainly by the maximum display luminance. According to an advantageous characteristic of the first embodiment, the color mapping operator 21 is a tone mapping operator 21. A tone mapping operator mainly modifies the intensity and only slightly the hue and/or saturation of the original colors. The disclosed device is not restricted to tone mapping operators. In other applications, the color mapping operators may also change hue and/or saturation of the original colors.

According to the first embodiment, the viewing conditions VC of a color is described by a single luminance being the maximum luminance of the display used to render a color graded version of an image. According to a variant of the first embodiment, the maximum luminance is the peak luminance that a display can achieve for a short time and/or a small image region. In other examples, the maximum luminance can be the maximum luminance that a display can achieve for the whole screen and for an unlimited time. The original color graded version G1 of the image is adapted to be viewed under original maximum luminance $VC1=L_{O,max}$. Thus $L_{O,max}$ is the maximum luminance of the original display used to render the original color graded version G1 of the image. The reference color graded version G2 of the image is adapted to be viewed under reference maximum luminance $VC2=L_{R,max}$. Thus $L_{R,max}$ is the maximum luminance of the reference display used to render the reference color graded version G2 of the image.

According to a particular characteristic, the original luminance $L_O$ is extracted from the original color graded version G1 in a module 25 configured for luminance calculation. In a variant, luminance calculation can be realized using the following formula taken from ITU-R BT.2020:

$$L_0 = 0.2627 R_0 + 0.6780 G_0 + 0.0593 B_0$$

where $R_0$, $G_0$, $B_0$ are color coordinates for red, green and blue, respectively, of the original color graded version G1.

As previously described, the original luminance $L_0$ is then mapped twice. First, the tone mapping operator 26 is configured with the original maximum luminance $L_{0,max}$ and the target maximum luminance $L_{T,max}$ and then used to map the original luminance $L_0$ into a first mapped luminance $L_1$. Second, the tone mapping operator 21 is configured with the original maximum luminance $L_{0,max}$ and the reference maximum luminance $L_{R,max}$ and then used to map the original luminance $L_0$ into a second mapped luminance $L_2$.

According to a first variant, the interpolation function is a linear interpolation function $(L_a, L_b) = \alpha L_a + (1-\alpha) L_b$. The function $f(L_a, L_b)$ calculated such that $f(L_2, L_0) = L_1$ according to the following equations:

$$L_1 = \alpha L_2 + (1-\alpha) L_0 \leftrightarrow L_1 = \alpha(L_2 - L_0) + L_2 \leftrightarrow \alpha = \frac{L_1 - L_2}{L_2 - L_0}$$

where $\alpha$ is a constant coefficient.

However, other interpolation functions are compatible with the first embodiment such as non-linear, parametric functions, splines or pre-calculated look up tables. As for, the linear interpolation function, such function is calculated such that $f(L_2, L_0) = L_1$.

Then, as described in step S3, once the interpolation function is calculated, it is applied to the original color graded version G1 and to the reference color graded version G2.

Thus, interpolating from the first and second color graded versions of the picture in order to obtain a third color graded version of the picture is applied on each pixel and comprises, for a pixel in the third color graded version of the picture, determining a color value as a result of the obtained interpolation function applied to color values of co-located pixels in the first and second color graded versions of the picture.

According to a first variant, the reference color graded version G2 having, for each color pixel, the color coordinates $R_R$, $G_R$, $B_R$ and the original color graded version G1 having, for each color pixel, the color coordinates $R_0$, $G_0$, $B_0$ the interpolation function is applied to each color coordinate in order to calculate the interpolated color graded version G3:

$$R_T = f(R_R, R_0)$$

$$G_T = f(G_R, G_0)$$

$$B_T = f(B_R, B_0)$$

where $R_T$, $G_T$, $B_T$ are the color coordinates of a color pixel in the interpolated color graded version G3. The interpolated color graded version G3 of the image with target viewing conditions is thus obtained from the reference color graded version G2 of the image with reference viewing conditions and the original color graded version G1 of the image with original viewing conditions.

In this first embodiment, the tone mapping operator 21, 26 is configured with luminance values only, instead from all trichromatic color coordinates. However, as discussed hereafter the first embodiment is not limited to the described variant of the tone mappers. Advantageously, the computational cost of the interpolation function derived from the above described tone mapper is thus reduced. The interpolation function is then—as described—applied to the red, green and blue color coordinates of the reference and original color so as to obtain the color coordinates of interpolated colors.

According to another variant for applying the interpolation function, the reference luminance $L_R$ of reference color graded version G3 is obtained according to $$L_R = 0.2627 R_R + 0.6780 G_R + 0.0593 B_R$$

from a reference color having the color coordinates $R_R$, $G_R$, $B_R$ and the original luminance is obtained according to $$L_0 = 0.2627 R_0 + 0.6780 G_0 + 0.0593 B_0$$

from an original color having the color coordinates $R_0$, $G_0$, $B_0$. Then the interpolation function is applied to the reference luminance $L_R$ and to the original luminance $L_0$ in order to calculate an interpolated luminance $L_T$ according to:

$$L_T = f(L_R, L_0)$$

The interpolated luminance $L_T$ can then be applied to the reference color in order to obtain the interpolated color, for example according to the following equation:

$$R_T = L_T / L_0 \times R_0$$

$$G_T = L_T / L_0 \times G_0$$

$$B_T = L_T / L_0 \times B_0$$

The skilled in the art will appreciate that the present principles are compliant with other tone mappers. The tone mapping operator can be any of known state of the art being adaptive according to the first embodiment to maximum display luminance.

According to a variant, assuming that the maximum display luminance is present somewhere in the images, a tone mapper is derived from the photographic tone mapper proposed by Erik Reinhard in his book entitled "High dynamic range imaging" published by Morgan Kaufmann in 2006. When applying this photographic tone mapper to the reference viewing conditions, the original luminance $L_0$ to be viewed under original maximum luminance $L_{0,max}$ is mapped to the second mapped luminance $L_2$ to be viewed under the reference maximum luminance $L_{R,max}$ according to the following equation:

$$\frac{L_0}{L_{0,max}} = \frac{L_2}{L_2 + L_{R,max}/a} \leftrightarrow L_2 = \frac{L_{R,max}}{a} \frac{L_0}{L_{0,max} - L_0}.$$

This equation is the inversion of Erik Reinhard's photographic tone mapper such as disclosed by Francesco ACM et al. in "Inverse Tone Mapping" (in Graphite, 2006). Equivalently, when the tone mapper is parametrized for target viewing conditions, the original luminance $L_0$ to be viewed under original maximum luminance $L_{0,max}$ is mapped to the first mapped luminance $L_1$ to be viewed under the target maximum luminance $L_{T,max}$ according to:

$$L_1 = \frac{L_{T,max}}{a} = \frac{L_0}{L_{0,max} - L_0}.$$

According to another variant, the tone mapper is the one from Mantiuk proposed in this paper entitled "*Display Adaptive Tone Mapping*" published in 2008 in *ACM SIG-*

GRAPH 2008 papers. Using this tone mapper, viewing conditions further comprise the minimum display luminance.

According to this tone mapper, the original luminance $L_0$ to be viewed under original minimum luminance $L_{0,min}$ and original maximum luminance $L_{0,max}$, is mapped to the second mapped luminance $L_2$ to be viewed under the reference minimum and maximum luminances $L_{R,min}$ and $L_{R,max}$, respectively, according to the following equation:

$$L_2 = L_{R,min} + \sum_{k=1}^{i-1} d_k + \beta \left( L_{R,max} - L_{R,min} - \sum_{k=1}^{N-1} d_k \right)$$

where $d_k$ is the difference $x_{i+1} - x_i$ of centers of histogram bins i+1 and i, the histogram being the histogram of the input original luminance image;

N—1 is the maximal number of bins;

i—1 is the bin of the original luminance $L_0$;

β is a constant value, which is inferior to 1 if the dynamic range of the input original image is superior to the display dynamic range, and superior to 1 else.

The original luminance $L_0$ is mapped to the first mapped luminance $L_1$ to be viewed under the reference minimum and maximum luminances $L_{T,min}$ and $L_{T,max}$, respectively, according to the following equation:

$$L_1 = L_{T,min} + \sum_{k=1}^{i-1} d_k + \beta \left( L_{T,max} - L_{T,min} - \sum_{k=1}^{N-1} d_k \right)$$

Then, from mapped luminance values $L_1$ and $L_2$ and from original luminance value $L_0$, the interpolation function according to any of its variant is calculated and the applied to reference color graded version G2 and to the original color graded version G1.

It will be appreciated, however, that the present principles are not restricted to the described tone mapper adaptive to minimum/maximum luminance, nor to the described linear interpolation function. Other method using at least one other viewing conditions may be used.

FIG. 5 illustrates the principles of color grade interpolation in a luminance space according to a non-limitative embodiment. The luminance $L_0$ of the original color graded version is adapted to be viewed under original viewing conditions. According to the first embodiment, the original viewing conditions are characterized in a display luminance range from zero to original maximum luminance $L_{0,max}$. The second mapped luminance $L_2$ is calculated by the tone mapping operator for reference maximum luminance $L_{R,max}$, while the reference luminance $L_R$ is the luminance of the reference color in G2. Both, luminance $L_2$ and luminance $L_R$ are to be viewed under reference viewing conditions. The reference viewing conditions are characterized in a display luminance range from zero to reference maximum luminance $L_{R,max}$.

The problem solved by the disclosed method is to calculate a color for target viewing conditions while neither the original color nor the reference color are adapted to target viewing conditions. A salient idea to solve the problem is to use ground truth obtained from a tone mapping operator and then to apply the same result to the original and reference colors where such ground truth is not available. To that end, the tone operator is chosen such that it can be parametrized with determined viewing conditions. The mapping operator calculates both luminances, respectively $L_2$ and $L_1$, for reference and for target viewing conditions, respectively $L_{R,max}$ and $L_{T,max}$. While such mapping is possible using the tone mapping operator, neither the original nor the reference color can be used for target viewing conditions. The obtained interpolation function is able to interpolate the luminance $L_T$ for target viewing conditions from the luminance for reference viewing conditions $L_R$ and from the luminance for original viewing conditions $L_0$. However, the interpolation function is obtained from a situation where ground truth is available. Ground truth in this case is calculated luminances $L_1$, $L_2$. The obtained interpolation function is also able to interpolate the ground truth luminance $L_1$ for target viewing conditions and from the ground truth luminance $L_2$ for reference viewing conditions and from the anyway available luminance $L_0$ for original viewing conditions. Since both, luminance $L_2$ and luminance $L_1$ are calculated by the tone mapping operator from $L_0$, the interpolation function F can easily be obtained from $L_0$, $L_1$, $L_2$. The obtained interpolation function is applied to the reference luminance $L_R$ and to the original luminance $L_0$ to obtain an interpolated luminance $L_T$ for the color graded version G3 that is valid for target viewing conditions $L_{T,max}$. The target viewing conditions are characterized in a luminance range from zero to target maximum luminance $L_{T,max}$.

Granted that the tone mapping operator behaves with respect to viewing conditions in a similar manner as the creative process generating the reference colors from original colors in case of change of maximum luminance of viewing conditions, the interpolated image is well adapted to a change of luminance viewing conditions. However, the tone operator may not be able to describe other creative effects linked to viewing conditions that differ between the original and the reference images. For example, the creative process for generating reference colors from original colors might be spatially locally adaptive to colors in the image while the tone mapping operator is not, as it is the case in the given above example. Furthermore, the tone mapping operator may be not able to describe differences in hue and saturation between original and reference colors. Thus, an interpolated image between two color graded video created by a colorist may benefit from other changes linked to change of viewing conditions compared to a mapped image calculated by a toner mapper. By using an adaptive interpolation responsive to results from a tone mapper, the obtained color graded version is specifically adapted to the viewing conditions of the targeted display while preserving complex, often local color changes between different content versions, color changes that the simple mapping operator cannot describe. Advantageously the obtained interpolation function is adapted to any type of tone mapping operator or more generally to color mapping operator used for target viewing conditions.

It is preferable that the tone mapping operator is of simple complexity to reduce computational effort for calculation of the interpolation function. The second tone mapping operator can be—for example—any global tone mapping operator known by the skilled in the art and described hereafter.

FIG. 6 represents a schematic view of a second embodiment of an adaptive color grade interpolation device 2 also compatible with the method claim of FIG. 3. According to the second embodiment, the viewing conditions comprise the color gamut of the display.

Advantageously, the second embodiment is adapted to viewing conditions (either target, original or reference) that differ mainly by the display color gamut. While as described for the first embodiment the interpolation is carried out directly in image color coordinates R,G,B, in the second embodiment, the interpolation function is applied in CIELAB space. To that end, R,G,B coordinates of image colors are transformed into X,Y,Z coordinates and then into CIE L*,a,*b* coordinates. Accordingly, the interpolation function is applied in CIELAB space as illustrated on FIG. 6.

The reference color graded version is adapted to viewing conditions characterized by a reference color gamut being difference from the original color gamut of the viewing conditions of the original color graded version of the image. The original color $C_0=(R_0\ G_0\ B_0)$ is mapped twice by the gamut mapping operator, first, into the target color gamut and second into the reference color gamut, resulting in the first and second mapped colors $C_1=(R_1\ G_1\ B_1)$ and $C_2=(R_2\ G_2\ B_2)$, respectively. From these mapped colors, an interpolation function $$f(C_a, C_b) = \begin{pmatrix} \alpha_R & 0 & 0 \\ 0 & \alpha_G & 0 \\ 0 & 0 & \alpha_B \end{pmatrix} C_a + \left[1 - \begin{pmatrix} \alpha_R & 0 & 0 \\ 0 & \alpha_G & 0 \\ 0 & 0 & \alpha_B \end{pmatrix}\right] C_b$$

is calculated with the coefficients $$\alpha_R = \left(\frac{R_1 - R_2}{R_2 - R_0}\right)$$

and respectively for $\alpha_G$ and $\alpha_B$.

Where $\alpha_R$, $\alpha_G$ and $\alpha_B$ are constant coefficients respectively for each color coordinates R, G, B.

For calculating the interpolated color, the reference and original colors are interpolated using the interpolation function resulting in the interpolated color.

The gamut mapping operator 21, 26 can be any known gamut mapping algorithm, for example Morovic and Luo review some algorithms is their paper entitled "The Fundamentals of Gamut Mapping: A Survey" and published in the Journal of Imaging Science and Technology in 2001.

The color gamut can be described using a Gamut Boundary Description using the Gamut ID format standardized by the IEC in IEC 61966-12-1 standard.

It will be appreciated, however, that the present principles are not restricted to this specific interpolation method for obtaining a third color-graded picture adapted to the characteristics of the end-user display. Other method using at least one other viewing conditions may be used.

Figure 7:
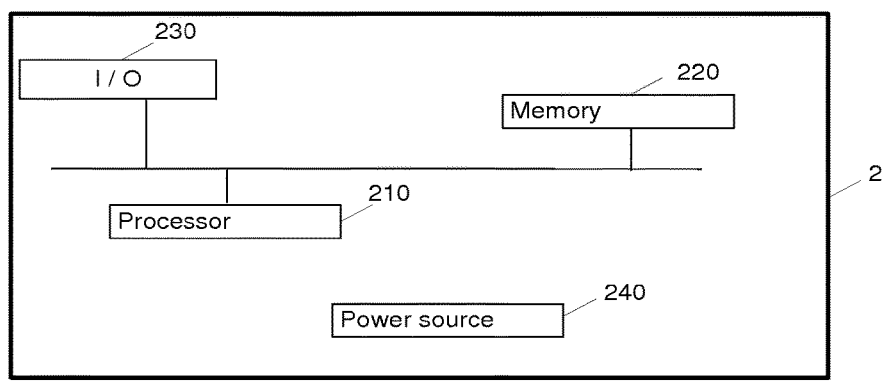
FIG. 7 represents an exemplary architecture of a color grade interpolation device 2 according to an exemplary and non-limiting embodiment.

FIG. 7 represents an exemplary architecture of a color grade interpolation device 2 according to an exemplary and non-limiting embodiment. The color grade interpolation device 2 is configured to execute the method described with reference to FIG. 3. The color grade interpolation device 2 comprises one or more processor(s) 210, which could comprise, for example, a CPU, a GPU and/or a DSP (English acronym of Digital Signal Processor), along with internal memory 220 (e.g. RAM, ROM and/or EPROM). The color grade interpolation device 2 comprises one or more Input/Output interface(s) 230, each adapted to display output information and/or allow a user to enter commands and/or data (e.g. a keyboard, a mouse, a touchpad, a webcam); and a power source 240 which may be external to the color grade interpolation device 2. The color grade interpolation device 2 may also comprise one or more network interface(s) (not shown). The color graded versions of the picture may be obtained from a source. According to different embodiments, the source can be, but not limited to:

a local memory, e.g. a video memory, a RAM, a flash memory, a hard disk;

a storage interface, e.g. an interface with a mass storage, a ROM, an optical disc or a magnetic support;

a communication interface, e.g. a wireline interface (for example a bus interface, a wide area network interface, a local area network interface) or a wireless interface (such as a IEEE 802.11 interface or a Bluetooth interface); and an image capturing circuit (e.g. a sensor such as, for example, a CCD (or Charge-Coupled Device) or CMOS (or Complementary Metal-Oxide-Semiconductor)).

According to different embodiments, the third color graded version of the picture may be sent to a destination, e.g. a display device. As an example, the third color graded version of the picture is stored in a remote or in a local memory, e.g. a video memory or a RAM, a hard disk. In a variant, the third color graded version of the picture is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to an exemplary and non-limiting embodiment, the color grade interpolation device 2 further comprises a computer program stored in the memory 220. The computer program comprises instructions which, when executed by the color grade interpolation device 2, in particular by the processor 210, enable the color grade interpolation device 2 to execute the method described with reference to FIG. 3. According to a variant, the computer program is stored externally to the color grade interpolation device 2 on a non-transitory digital data support, e.g. on an external storage medium such as a HDD, CD-ROM, DVD, a read-only and/or DVD drive and/or a DVD Read/Write drive, all known in the art. The decoding device 2 thus comprises a mechanism to read the computer program. Further, the color grade interpolation device 2 could access one or more Universal Serial Bus (USB)-type storage devices (e.g., "memory sticks.") through corresponding USB ports (not shown). According to exemplary and non-limiting embodiments, the color grade interpolation device 2 can be, but not limited to:

a mobile device;
a communication device;
a game device;
a set top box;
a TV set;
a tablet (or tablet computer);
a laptop;
a video player, i.e. a Blu-Ray disc player;
a display;
a camera; and
a decoding chip.

The color grade interpolation device 2 is advantageously part of a player 300 or of a TV set.

Figure 8:
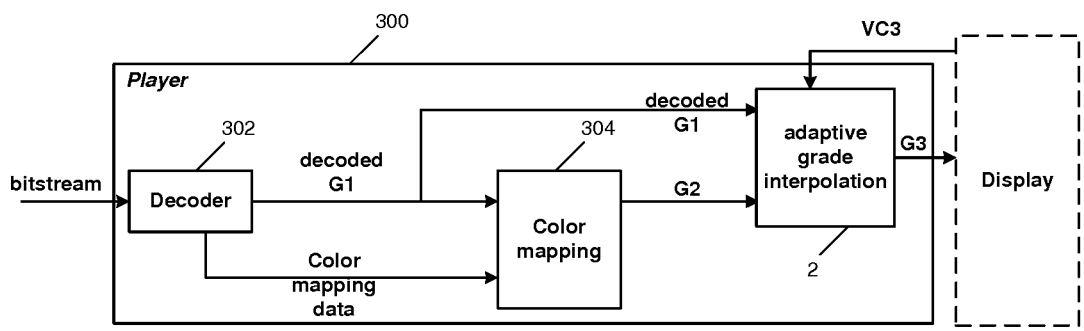
FIG. 8 represents a player 300 according to an exemplary and non-limiting embodiment.

FIG. 8 represents a player 300 according to an exemplary and non-limiting embodiment. The player 300 receives on an input a bitstream. The input is connected a decoder 302 which is in turn connected to a color mapping circuit 304. The decoder 302 is configured to decode the first color graded version of the picture and the color mapping data. The color mapping circuit 304 is configured to determine the second color graded version of the picture from the decoded first color graded version responsive to the decoded color mapping data. In a variant not shown on FIG. 8, both first and second color graded version of the picture are directly decoded from a bitstream for instance stored on a DVD. One output of the color mapping circuit 304 and one output of the decoder 302 are connected on inputs of a color grade interpolation device 2. The color grade interpolation device 2 is configured to execute the method described with reference to FIG. 3. The output of the color grade interpolation device 2 is connected to an output of the player 300. In a specific embodiment, the player 300 comprises one or more processor(s), which could comprise, for example, a CPU, a GPU and/or a DSP (English acronym of Digital Signal Processor), along with internal memory (e.g. RAM, ROM and/or EPROM). The player 300 comprises one or more Input/Output interface(s), each adapted to display output information and/or allow a user to enter commands and/or data (e.g. a keyboard, a mouse, a touchpad, a webcam); and a power source which may be external to the player 300. The player 300 may also comprise one or more network interface(s) (not shown).

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising interpolating a first color graded version of a picture adapted to first viewing conditions and a second color graded version of said picture different from the first color graded version and adapted to second viewing conditions in order to obtain a third color graded version of the picture adapted to third viewing conditions wherein said interpolating is obtained from said first color graded version, a first mapped color version of said first color graded version adapted to said third viewing conditions, a second mapped color version of said first color graded version adapted to said second viewing conditions such that said first color graded version and second mapped color version are interpolated into said first mapped color version.

2. The method according to claim 1, wherein said viewing conditions comprise at least one of:
display maximum luminance;
display minimum luminance;
display color gamut;
environment maximum luminance;
environment mean luminance;
environment dominant color.

3. The method according to claim 1, wherein said first and second mapped color versions of said picture are obtained by a color mapping algorithm adjusted for viewing conditions and configured to map at least a color into a mapped color adapted to said viewing conditions.

4. The method according to claim 3, wherein said interpolating comprises:

mapping said first color graded version into said first mapped color version adapted to third viewing conditions using said color mapping algorithm adjusted for third viewing conditions;

mapping said first color graded version into a second mapped color version adapted to second viewing conditions using said color mapping algorithm adjusted for second viewing conditions;

obtaining an interpolation function from said first color graded version, first mapped color version and second mapped color version defined such that the interpolation function interpolates said first color graded version and second mapped color version into said first mapped color version;

applying said interpolation function to said first color graded version and said second color graded version to obtain said third color graded version.

5. The method according to claim 3, using a tone mapping algorithm as color mapping algorithm and wherein said interpolating comprises:

obtaining a first luminance from said first color graded version;

mapping said first luminance into a first mapped luminance adapted to third viewing conditions using said tone mapping algorithm adjusted for third viewing conditions;

mapping said first luminance into a second mapped luminance adapted to second viewing conditions using said tone mapping algorithm adjusted for second viewing conditions;

obtaining an interpolation function from said first luminance, first mapped luminance and second mapped luminance defined such that the interpolation function interpolates said first luminance and second mapped luminance into said first mapped luminance;

applying said interpolation function to said first color graded version and said second color graded version to obtain said third color graded version.

6. The method according to claim 4 further comprising using a gamut mapping algorithm as color mapping algorithm.

7. The method according to claim 4, wherein interpolating said first and second color graded versions of the picture in order to obtain a third color graded version of the picture comprises, for a pixel in said third color graded version of said picture, determining a color value as a result of the obtained interpolation function applied to color values of co-located pixels in said first and second color graded versions of said picture.

8. A device comprising a processor configured to interpolate from a first color graded version of a picture adapted to first viewing conditions and a second color graded version of said picture different from the first color graded version and adapted to second viewing conditions in order to obtain a third color graded version of the picture adapted to third viewing conditions wherein said interpolating is obtained from said first color graded version, a first mapped color version of said first color graded version adapted to said third viewing conditions and a second mapped color version of said first color graded version adapted to said second viewing conditions such that said first color graded version and second mapped color version are interpolated into said first mapped color version.

9. A non-transitory processor readable medium having stored therein instructions for causing a processor to perform at least interpolating from a first color graded version of a picture adapted to first viewing conditions and a second color graded version of said picture different from the first color graded version and adapted to second viewing conditions in order to obtain a third color graded version of the picture adapted to third viewing conditions wherein said interpolating is obtained from said first color graded version, a first mapped color version of said first color graded version adapted to said third viewing conditions and a second mapped color version of said first color graded version adapted to said second viewing conditions such that said first color graded version and second mapped color version are interpolated into said first mapped color version.

10. A non-transitory program storage device, readable by a computer, tangibly embodying a program of instructions executable by the computer to perform a method comprising interpolating from a first color graded version of a picture adapted to first viewing conditions and a second color graded version of said picture different from the first color graded version and adapted to second viewing conditions in order to obtain a third color graded version of the picture adapted to third viewing conditions wherein said interpolating is obtained from said first color graded version, a first mapped color version of said first color graded version adapted to said third viewing conditions and to a second mapped color version of said first color graded version adapted to said second viewing conditions such that said first color graded version and second mapped color version are interpolated into said first mapped color version.

11. The device according to claim 8, wherein said device belongs to a set comprising:
a mobile device;
a communication device;
a game device;
a set top box;
a TV set;
a Blu-Ray disc player;
a player;
a tablet (or tablet computer);
a laptop;
a display;
a camera and
a decoding chip.

12. The device according to claim 8, wherein said viewing conditions comprise at least one of:
display maximum luminance;
display minimum luminance;
display color gamut;
environment maximum luminance;
environment mean luminance;
environment dominant color.

13. The device according to claim 8, wherein said first and second mapped color versions of said picture are obtained by applying a color mapping operator, said color mapping operator being adjusted for viewing conditions and configured to map at least a color into a mapped color adapted to said viewing conditions.

14. The device according to claim 13, wherein, wherein said interpolating comprises:
mapping said first color graded version into said first mapped color version adapted to third viewing conditions using said color mapping operator adjusted for third viewing conditions;
mapping said first color graded version into a second mapped color version adapted to second viewing conditions using said color mapping operator adjusted for second viewing conditions;
obtaining an interpolation function from said first color graded version, first mapped color version and second mapped color version defined such that the interpolation function interpolates said first color graded version and second mapped color version into said first mapped color version;

applying said interpolation function to said first color graded version and said second color graded version to obtain said third color graded version.

15. The device according to claim 13 using a tone mapping algorithm as color mapping algorithm.

16. The device according to claim 15, wherein said interpolating comprises:

obtaining a first luminance from said first color graded version;

mapping said first luminance into a first mapped luminance adapted to third viewing conditions using said tone mapping algorithm adjusted for third viewing conditions;

mapping said first luminance into a second mapped luminance adapted to second viewing conditions using said tone mapping algorithm adjusted for second viewing conditions;

obtaining an interpolation function from said first luminance, first mapped luminance and second mapped luminance defined such that the interpolation function interpolates said first luminance and second mapped luminance into said first mapped luminance;

applying said interpolation function to said first color graded version and said second color graded version to obtain said third color graded version.

17. The device according to claim 14 further comprising using a gamut mapping algorithm as color mapping algorithm.

18. The device according to claim 13, wherein interpolating said first and second color graded versions of the picture in order to obtain a third color graded version of the picture comprises, for a pixel in said third color graded version of said picture, determining a color value as a result of the obtained interpolation function applied to color values of co-located pixels in said first and second color graded versions of said picture.

* * * * *